Jan. 2, 1968　　　　　E. G. SMOCK　　　　3,361,476

DUMPING VEHICLE HAVING AN AUXILIARY DISCHARGE

Filed June 2, 1966　　　　　　　　　　2 Sheets-Sheet 1

INVENTOR.
EDMUND G. SMOCK

BY *Kimmel, Crowell & Weaver*

ATTORNEYS.

INVENTOR
EDMUND G. SMOCK
BY Kimmel, Crowell & Weaver
ATTORNEYS.

United States Patent Office 3,361,476
Patented Jan. 2, 1968

3,361,476
DUMPING VEHICLE HAVING AN AUXILIARY
DISCHARGE
Edmund G. Smock, Winding Way,
Zanesville, Ohio 43701
Filed June 2, 1966, Ser. No. 554,721
7 Claims. (Cl. 298—7)

ABSTRACT OF THE DISCLOSURE

A dump truck having a pivotally movable tail gate which includes an opening therein, a chute pivotally mounted below the opening and operating means which may be either a winch or a fluid motor for controlling the position of the chute to fully close the opening or to fully open the opening for controlling or stopping the discharge of material through the opening is disclosed.

This invention relates to dumping vehicles, and more particularly to a dump truck having a conventional tail gate closing the rear of the dump truck for discharging materials in a conventional manner, the tail gate being equipped with a discharge opening, the size of which is conveniently controlled by an operator to regulate the rate of flow therethrough.

General purpose dump trucks are conventionally constructed having a load-carrying body mounted for tilting movement about an axis transverse to the general direction of travel with a pivotally mounted tail gate closing the rear of the body. Suitable means are provided, such as a conventional slotted ear and chain, for retaining the tail gate in the closed position. In the operation of a conventional dump truck, the truck is moved to the location where the material is to be unloaded with the operator unhooking the means connecting the tail gate in the closed position. The operator will then actuate suitable means to raise the forward end of the dump truck with the load gravitating out of the open rear of the vehicle.

In utilizing dump trucks in a contract hauling endeavor, it often occurs that different types of materials are hauled some of which must be discharged into a relatively confined area at a gradual rate. In the past, the operator has attempted to raise the vehicle body at a rate such that the material therein will slowly pass though the open end of the truck body into the desired area. Because of the nature of materials in the truck, this operation is often unsuccessful in that a large quantity of material will come out of the truck body followed by a period of almost non-existent flow from the dump truck. This situation is aggravated if the materials must be discharged into a confined area, such as a container, hopper, endless belt or the like.

In brief terms, the instant invention comprises a dump truck having a conventional tail gate for normal dumping operations and a flow controlling gate in the tail gate for providing a means of controlling the discharge area and discharge velocity of the material being unloaded. Structurally, the instant invention comprises a dump truck of a substantially conventional type with the tail gate thereof forming an auxiliary discharge opening. A ramp is pivotally mounted on the tail gate below the auxiliary discharge opening with means being provided for selectively pivoting the ramp from a first position closing the discharge opening to a second position at least partially uncovering the discharge opening with the pivoting means being arranged for allowing pivotal movement of the tail gate free from obstructions thereby providing for the discharge of material either through the rear of the truck body or through the auxiliary opening.

It is an object of the instant invention to provide a dump truck equipped with means for discharging material from the load-carrying body either through the entire width of the tail gate or through a restricted opening.

Still another object of the instant invention is to provide a dump truck having an auxiliary opening in the tail gate provided with a ramp normally positioned to close the auxiliary opening and means for incrementally uncovering the discharge opening for controlling the rate of material flow through the auxiliary opening.

A further object of the instant invention is to provide at least one angled plate in the truck body having one end mounted adjacent the auxiliary discharge opening to direct material thereto.

A still further object of the instant invention is to provide a dump truck having an auxiliary opening, a ramp pivotally mounted under the discharge opening and means, mounted on the tail gate, for controlling the position of the ramp thereby allowing free pivotal movement of the tail gate for conventional discharge from the dump truck.

Another object of the instant invention is to provide a dump truck having an auxiliary opening, a ramp pivotally mounted under the discharge opening for directing material flow, and means mounted under the tail gate and operatively connected with the ramp for controlling the position of the ramp, the controlling means being arranged for selective movement out of the path of pivotal movement of the tail gate.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

Figure 1:
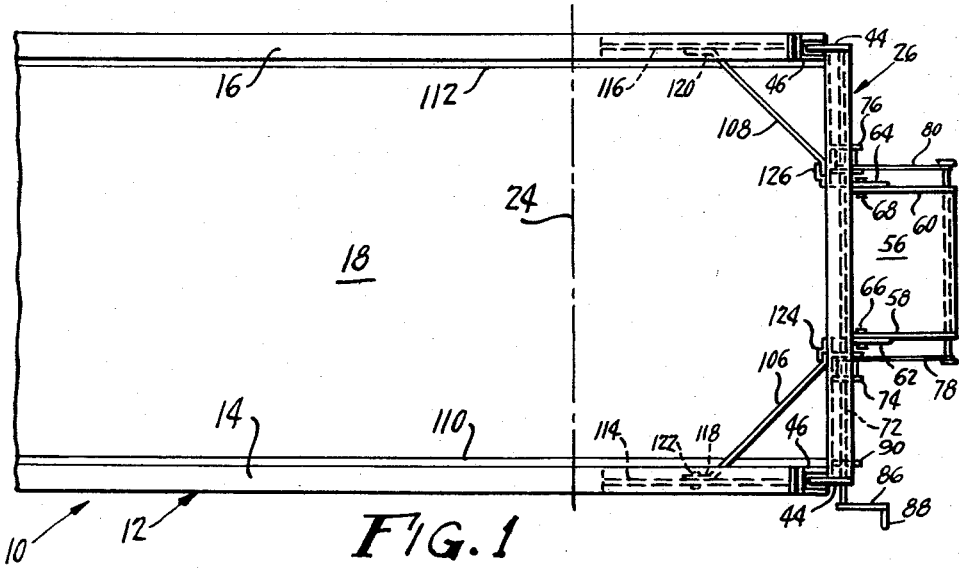
FIGURE 1 is a partial top plan view of a dump truck equipped with the flow controlling gate of the instant invention which is illustrated in the open position.
Figure 2:
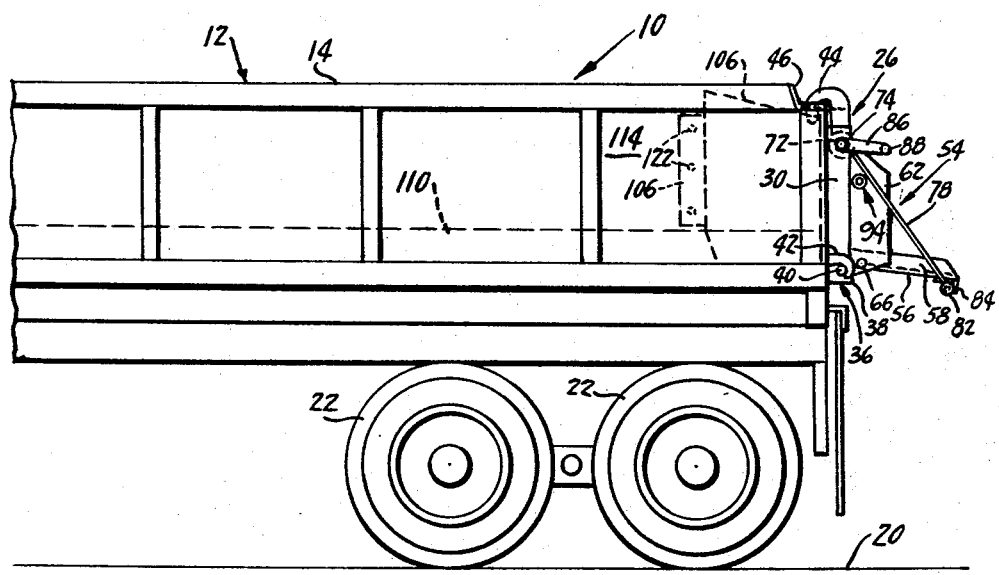
FIGURE 2 is a side elevational view of the representation of FIGURE 1.
Figure 3:
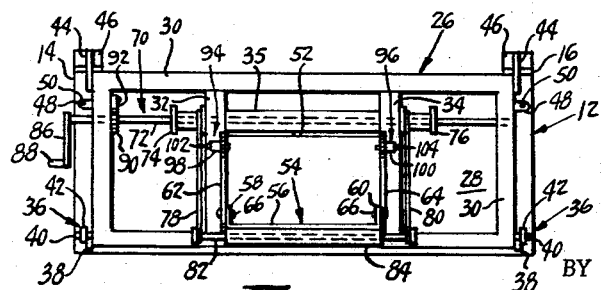
FIGURE 3 is a rear elevational view of the load-carrying body, tail gate and flow controlling mechanism illustrated in FIGURES 1 and 2.

Referring now to the drawings in detail, wherein like reference characters designate like elements throughout the several views thereof, and particularly to FIGURES 1 to 3 inclusive, there is illustrated generally at 10 a substantially conventional dump truck having a load-carrying body shown generally at 12 comprised of upstanding sidewalls 14, 16 and a bottom wall 18. Load-carrying body 12 is supported from an underlying ground surface 20 by a plurality of wheels 22 with body 12 being conventionally arranged for pivotal movement about an axis 24 transverse to the general direction of travel of truck 10. A tail gate shown generally at 26 is comprised of a substantially planar sheet of material 28 having suitable peripheral reenforcing braces 30 and a pair of substantially vertical intermediate braces 32, 34 interconnected by a cross brace 35 as shown in FIGURE 3.

Tail gate 26 is illustrated as mounted on truck body 12 along the lower portion thereof by a pivotal mounting means 36 of a conventional nature. Mounting means 36 comprises an outwardly extending ear 38 carrying a pin 40 integral with tail gate 26. A hooked arm 42 is mounted above pin 40 retaining against ear 38 with arm 42 preferably being movably mounted to allow removal of tail gate 26 all in a conventional manner. The upper end of tail gate 26 is preferably provided with a pair of L-shaped legs 44 received in brackets 46 on side walls 14, 16 thereby accurately positioning tail gate 26 in the closed position. Acting to retain tail gate 26 in the closed position is a pair of apertured ears 48 extending outwardly from each side of tail gate 26 receiving therethrough another apertured ear 50 through which a conventional fastener such as a hook on the end of a chain may be positioned to retain tail gate 26 in the closed position in a conventional manner.

It will be appreciated by those skilled in the art that the structure heretofore discussed is substantially conventional and may be operated in a conventional manner. For example, when the operator desires to unload the material from body 12, he will disengage the fastener securing ears 48, 50 together thereby allowing tail gate 26 to pivot about the axis of pins 40. The operator then manipulates the body raising means (not shown) to tilt body 12 about axis 24 thereby discharging the material through the open end of body 12.

As shown best in FIGURE 3, tail gate 26 forms a central opening 52 constituting an auxiliary discharge opening through which material may exit from body 12 when the unloading situation so requires. Closing opening 52 is a flow controlling gate shown generally at 54 comprised of a ramp 56 having upstanding sidewalls 58, 60. Sidewalls 58, 60 are pivotally mounted to a pair of upstanding stationary deflecting plates 62, 64 by a pair of pivot pins 66, 68. It will be readily apparent that ramp 56 is movable from a first position closing discharge opening 52 to a second position at least partially uncovering opening 52 to allow the eflux of material from body 12.

Providing for the forcible pivotal movement of ramp 56 is a winch shown generally at 70 comprised of a shaft 72 journaled for rotation between braces 30, 32, 34, extending through hollow brace 35 and fixedly carrying a pair of spools 74, 76 respectively spaced between vertical braces 30, 32 and vertical braces 30, 34. A flexible elongate member 78, 80 is attached at one end thereof to each of spools 74, 76 and fixedly secured at the other end thereof to a rod 82 rigidly connected to a bracket 84 connected to the bottom of ramp 56.

An operating handle 86 is mounted on shaft 72 laterally of the confines of body 12 and carries a convenient grasping means 88 on the end thereof so that the individual may conveniently rotate shaft 72 thereby taking up or letting out elongate members 78, 80 to control the attitude of ramp 56. A ratchet 90 is affixed on shaft 72 and is positioned adjacent a pawl 92 in a conventional manner to allow selective downward pivotal movement of ramp 56. Ratchet 90 and pawl 92 are arranged such that the individual may rotate handle 86 to raise ramp 56 while pawl 92 engages ratchet 90 to prevent inadvertent downward pivoting of ramp 56. It will be readily apparent that the pivoting means of the instant invention allows incremental pivotal movement of gate 54 thereby selectively controlling the rate of material discharge from body 12. Because of the restricted lateral extent of opening 52, it will also be evident that the discharge may be funneled into a relatively small area.

Since winch 70 is attached only to tail gate 26, it will be seen that the tail gate may be pivoted about the axis of pins 40 without disturbing gate 54. This is of particular importance when it is desired to utilize dump truck 10 in its conventional mode. For example, with gate 56 in the first position closing discharge opening 52, the fasteners securing ears 48, 50 together may be removed thereby allowing tail gate 26 to open the end of body 12. Since large forces are often exerted on gate 54 when it is in the first position, additional securing means shown generally at 94, 96 are provided. Securing means 94, 96 may be of any type necessary to affix ramp 56 in the closed position, but are illustrated as a pair of sleeves 98, 100 secured to intermediate braces 32, 34 and threadably receiving a shank 102, 104. When it is desired to manipulate ramp 56, shanks 102, 104 which extend through stationary deflecting plates 62, 64 are unthreaded to preclude interference between the ends thereof and ramp 56. Conversely, when it is desired to secure ramp 56 in the closed position, shanks 102, 104 may be threaded through stationary deflecting plates 62, 64 thereby preventing downward pivotal movement of gate 54.

Referring now to FIGURES 1 and 2, an angled plate 106, 108 is positioned in body 12 on each side of auxiliary discharge 52 to direct the flow of material thereto when body 12 is tilted. Although it should be understood that plates 106, 108 may be secured in the position shown in any conventional manner, the connecting means used should preferably be of the type that allows ready removal of plates 106, 108. As shown best in FIGURE 1, side walls 14, 16 include inwardly angled portions 110, 112 depending from relatively thin side plates 114, 116. The inner ends 118, 120 of angled plates 106, 108 are juxtaposed to plates 114, 116 and releasably secured thereto by a plurality of fasteners 122, which may be of any suitable type, such as screws or nuts and bolts. The outer end of plates 106, 108 are preferably received in a Z-shaped bracket 124, 126 positioned on tail gate 26. It will be readily apparent that the removal of fasteners 122 allows plates 106, 108 to be raised vertically out of body 12.

Figure 4:
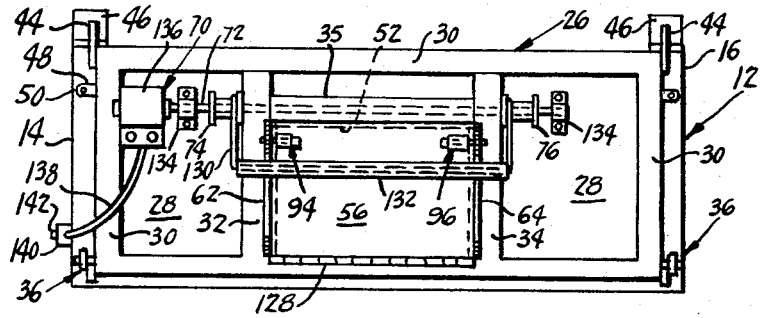
FIGURE 4 is a rear elevational view, similar to FIGURE 3, of another form of the instant invention illustrating an electrically powered means for positioning the flow ramp, the ramp being shown in the closed position.

Referring now to FIGURE 4, another embodiment of the instant invention is illustrated which is substantially identical to the embodiment of FIGURES 1 to 3 inclusive, like reference characters being used to designate like elements for purposes of brevity. As illustrated in FIGURE 4, ramp 56 is pivotally mounted beneath auxiliary discharge opening 52 by a hinge 128 with a single elongate member 130 being wound about spools 74, 76 and threaded through a tubular holder 132 affixed to the bottom of ramp 56. Auxiliary holding means 94, 96 are illustrated as secured to the bottom of ramp 56 for engagement with deflecting plates 62, 64 when ramp 56 is in the raised position. Shaft 72 of winch 70 is mounted for rotation by a pair of journals 134 with an electric motor 136 providing the motive power for rotating shaft 72. Motor 136 is mounted on sheet 28 of tail gate 26 and is electrically connected by a power line 138 to a switch 140 having a plurality of operating buttons 142 mounted laterally of tail gate 26 on side wall 14.

Switch 140 is connected to a source of electric power (not shown) in a conventional manner such that the depression of selected ones of buttons 142 actuates electric motor 136 to rotate shaft 72 thereby reeling elongate member 130 on spools 74, 76 to raise ramp 56. Because power line 138 is of sufficient length and flexibility to move when tail gate 26 is pivoted about the axis of mounting means 36, it will be readily apparent that material may be discharged throughout the entire width of body 12 or through auxiliary discharge opening 52 as is desired by the operator. It will be readily apparent that the ramp pivoting means of FIGURE 4 allows free pivotal movement of tail gate 26 thereby allowing the selective areas of discharge.

Figure 5:
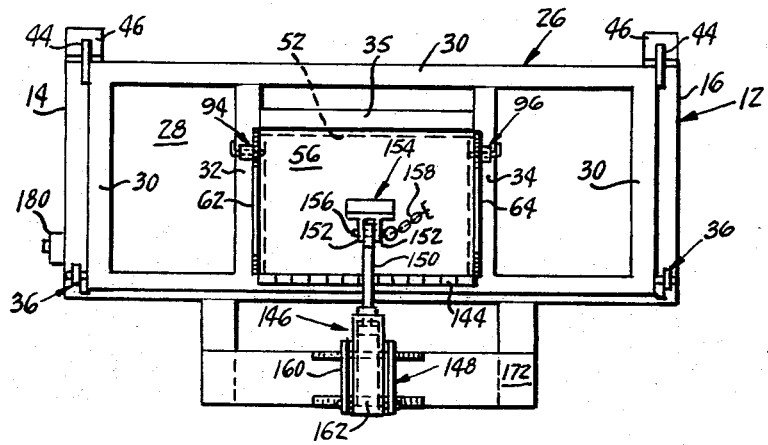
FIGURE 5 is a rear elevational view, similar to FIGURES 3 and 4, illustrating another means of controlling the attitude of the flow ramp.
Figure 6:
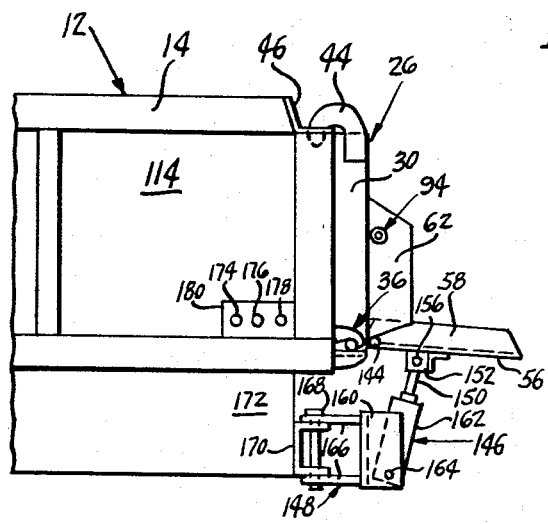
FIGURE 6 is a side elevational view of the embodiment of FIGURE 5 illustrating the ramp in the open position.

Referring now to FIGURES 5 and 6, another embodiment of the instant invention is illustrated with like reference characters being used to designate like elements for purposes of brevity. As in the embodiment of FIGURE 4, ramp 56 is pivotally mounted beneath discharge opening 52 by a hinge 144. The main difference between the embodiment of FIGURES 5 and 6 and the embodiment of FIGURES 1 to 3 inclusive, lies in the provision of an extensible fluid motor shown generally at 146 and a mounting means shown generally at 148 securing motor 146 to truck 10. Motor 146 is preferably a double acting hydraulic motor, although it should be understood that it may be air operated or single acting, having a piston rod 150 pivotally secured between the ears 152 of a bracket shown generally at 154 fixedly secured to the bottom of ramp 56. A releasable pin 156 connects rod 150 between ears 152 and is secured to ramp 156 by a suitable chain 158 for purposes more fully explained hereinafter.

Mounting means 148 includes a U-shaped bracket 160 receiving the body 162 of motor 146 therein with a transverse pivot pin 164 allowing for pivotal movement of motor 162. A pair of apertured arms 166 extend forwardly from bracket 160 and receive a vertical pivot pin 168 extending through a support 170 fixedly secured to a depending portion 172 of truck 10. When it is desired to manipulate motor 146 to raise and lower ramp 56, the operator stands beside the rear of truck 10 and depresses one of a plurality of buttons 174, 176, 178 of a valve 180 thereby controlling the flow of pressurized fluid to motor 146 as will be explained more fully hereinafter.

When it is desired to lower ramp 56 from the position shown in FIGURE 5 to the position shown in FIGURE 6, the operator depresses button 174 thereby retracting rod 150 within body 162 in a conventional manner. When it is desired to close ramp 56, the operator depresses button 176 thereby extending rod 150 and sealing auxiliary discharge opening 52. Button 178 is provided to lock the fluid in motor 146 thereby fixedly positioning rod 150 at a predetermined point. If it is desired to discharge material from truck body 12 through the entire width thereof, securing means 94, 96 are manipulated to secure ramp 56 in the closed position followed by the removal of pin 156 from between ears 152 thereby freeing piston rod 150. The operator will then depress button 174 to retract rod 150 and then pivot motor 146 and mounting means 148 about the vertical axis provided by pin 168. Suitable restraining devices, such as chains or the like, may be used to retain motor 146 and mounting means 148 in the pivoted position. It will be readily apparent that motor 146 will be out of the way of tail gate 26 thereby allowing conventional discharge of material from within load-carrying body 12.

Figure 7:
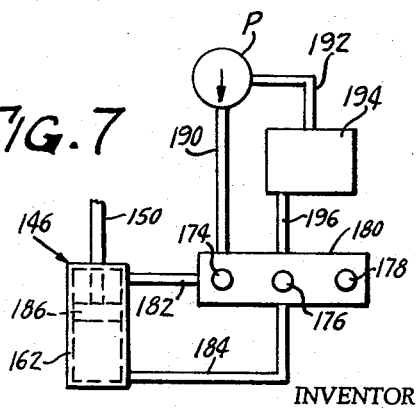
FIGURE 7 is a schematic view of the fluid system utilized in operating the embodiment of FIGURE 6.

Although any conventional means may be used to deliver pressurized fluid to motor 146, a typical arrangement is shown in FIGURE 7 for purposes of a complete disclosure. As shown in FIGURE 7, a pair of fluid lines 182, 184 connect valve 180 with motor body 162 on opposite sides of piston 186. A suitable pressure source 188 is connected to valve 180 by a fluid line 190 with the other branch of the fluid supplying circuit being provided by a fluid line 192 connecting pump 188 to a reservoir 194 and a fluid line 196 connecting reservoir 194 to valve 180. Valve 180 is of a conventional type to deliver pressurized fluid from fluid line 190 to either of fluid lines 182, 184 with low pressure fluid being passed through valve 180 and fluid line 196 into reservoir 194 all as will be apparent to one skilled in the art. It should be pointed out that fluid lines 182, 184 are of sufficient length to allow the pivotal movement of motor 146 and mounting means 148 as previously mentioned.

It is now seen that there is herein provided an improved dumping vehicle having an auxiliary discharge which accomplishes all of the objects and advantages of the instant invention and others, including many advantages of great practical utility and commercial importance.

Since many embodiments may be made of the instant inventive concept, and since many modifications may be made from the embodiments hereinbefore shown and described, it is to be understood that the foregoing is to be interpreted merely as illustrative and not in a limiting sense.

I claim:

1. In combination with a dump truck of the type having a load carrying body mounted for tilting movement about an axis transverse to the general direction of travel,
 a tail gate, mounted on the rear of the body for pivotal movement between a first position closing the rear of the body and a second position opening the rear of the body for passing material from the body throughout the entire width of the truck body, the tail gate forming an auxiliary discharge opening;
 means normally retaining the tail gate in the first position; and
 a flow controlling gate for the auxiliary opening including
  a ramp pivotally mounted on the tail gate below the auxiliary discharge opening in material receiving relation from the body,
  means, connected to the ramp, for selectively pivoting the ramp from a first position closing the auxiliary opening to a second position at least partially uncovering the auxiliary opening, the pivoting means including a winch mounted on the tail gate, an elongate member on the winch secured to the ramp and means for rotating the winch, for allowing pivotal movement of the tail gate free from obstructions for discharge of material either through the rear of the truck body or through the auxiliary opening and for selectively controlling or stopping the flow of material through the auxiliary opening at any desired point.
  ramp and means for rotating the winch, and for selectively controlling or stopping the flow of material through the auxiliary opening at any desired point.

2. In combination with a dump truck of the type having a load carrying body mounted for tilting movement about an axis transverse to the general direction of travel,
 a tail gate, mounted on the rear of the body for pivotal movement between a first position closing the rear of the body and a second position opening the rear of the body for passing material from the body throughout the entire width of the truck body, tail gate forming an auxiliary discharge opening;
 means normally retaining the tail gate in the first position; and
 a flow controlling gate for the auxiliary opening including
  a ramp pivotally mounted on the tail gate below the auxiliary discharge opening in material receiving relation from the body,
  means, connected to the ramp, for selectively pivoting the ramp from a first position partially uncovering the auxiliary opening, the pivoting means being arranged for allowing pivotal movement of the tail gate free from obstructions for discharge of material either through the rear of the truck body or through the auxiliary opening, said pivoting means including
 an extensible fluid motor;
 means operatively connecting the fluid motor to the ramp;
 a support carrying the fluid motor; and
 means mounting the support on the truck body for selective movement from a first position beneath the tail gate and ramp to a second position spaced from the tail gate and ramp.

3. The dump truck of claim 2 further including at least one angled plate, having one end placed adjacent the auxiliary discharge opening for directing material thereto and means mounting the plate in the body.

4. The dump truck of claim 2 wherein the pivoting means includes means for incrementally raising and lowering the ramp.

5. The dump truck of claim 2 wherein the connecting means includes means releasably connecting the fluid motor to the ramp.

6. The dump truck of claim 5 further including auxiliary connecting means on the tail gate, for securing the ramp in closed position when the fluid motor is disconnected from the ramp.

7. The dump truck of claim 5 wherein the support mounting means includes means mounting the support for pivotal movement about a vertical axis, the vertical axis being spaced from the tail gate toward the front of the truck.

References Cited

UNITED STATES PATENTS

| | | | |
|---|---|---|---|
| 212,746 | 2/1879 | Rodenhausen | 298—7 |
| 603,818 | 5/1898 | Hotz | 298—7 |
| 1,468,294 | 9/1923 | Hill | 296—51 X |
| 1,788,999 | 1/1931 | Gorsuch | 298—7 X |
| 2,212,058 | 8/1940 | Wood. | |
| 2,344,755 | 3/1944 | Venard | 296—51 |
| 2,563,736 | 8/1951 | Newell | 296—51 |
| 2,678,121 | 5/1954 | Phillips | 296—51 X |
| 2,764,450 | 9/1956 | Rosener | 298—7 |
| 2,878,053 | 3/1959 | Yunker. | |

RICHARD J. JOHNSON, *Primary Examiner.*

UNITED STATES PATENT OFFICE

CERTIFICATE OF CORRECTION

Patent No. 3,361,476  
January 2, 1968

Edmund G. Smock

It is certified that error appears in the above identified patent and that said Letters Patent are hereby corrected as shown below:

Column 6, line 28, beginning with "ramp" cancel all to and including "point." in line 31, same column 6.

Signed and sealed this 12th day of August 1969.

(SEAL)  
Attest:

Edward M. Fletcher, Jr.  
Attesting Officer

WILLIAM E. SCHUYLER, JR.  
Commissioner of Patents